Patented May 10, 1927.

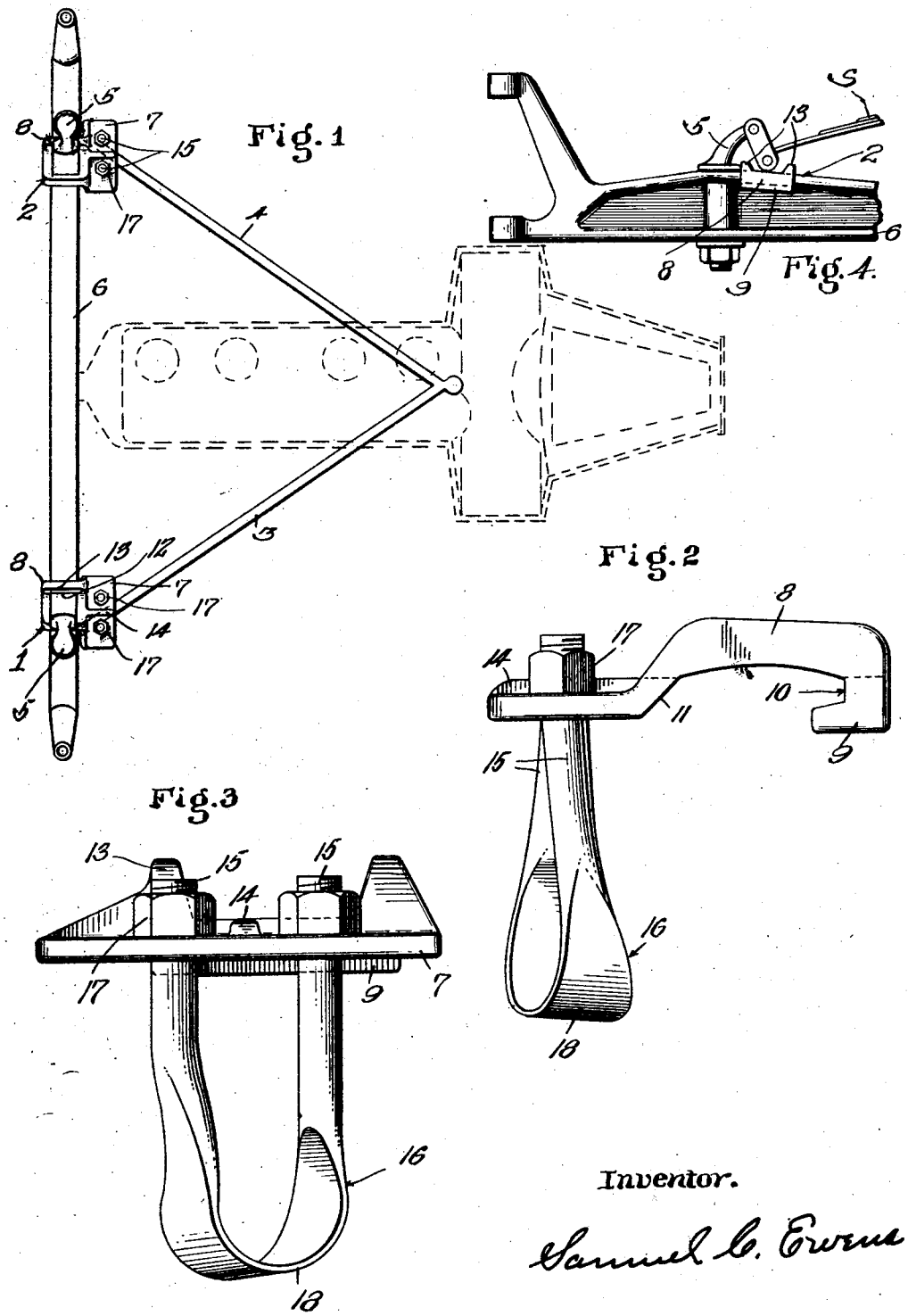

1,627,695

UNITED STATES PATENT OFFICE.

SAMUEL C. EWENS, OF SPRINGHILL, LOUISIANA.

RADIUS-ROD CLAMP.

Application filed March 15, 1924. Serial No. 699,585.

This invention relates to improvements in clamping devices for the front radius rod of an automobile of the Ford type of construction, and it consists in the combinations, constructions and arrangements herein described and claimed.

An object of the invention is the provision of a simple, reliable and efficient device which affords facilities for staying the radius rod to the front axle of an automobile for the purpose of preventing undue stress on the usual retaining nut on the front spring perch of the automobile, thus tending to prevent loosening of the retaining nut from the front spring perch and displacement of the radius rod, whereby the front axle will be securely held in proper position to permit easy steering of the automobile without undue wear on the bearings and relatively moving parts which are comprised in and associated with the steering mechanism of the automobile.

A further object of the invention is the provision of a front radius rod clamping device of the character described which is adapted to be operatively applied on an automobile of the Ford type of construction without any changes in the usual construction of the axle and radius rod assembly of the automobile being required.

Other objects and advantages of the invention will be apparent from the following description, considered in conjunction with the accompanying drawing, in which Figure 1 is a plan view of the front axle and certain of the parts which are associated therewith in an automobile of ordinary construction, showing the invention operatively applied, the front spring of the automobile being omitted, Figure 2 is a side elevation of one of a pair of clamping members which the invention provides, Figure 3 is a rear elevation of the clamping member exhibited in Figure 2, the view being taken substantially at right angles to Figure 2, and Figure 4 is a fragmentary front elevation of a portion of the front axle, showing one of the improved clamping devices applied to the axle and showing also a portion of the associated front spring of the automobile.

The invention contemplates the provision of a pair of clamping members indicated generally at 1 and 2 respectively in Figure 1. The respective clamping members 1 and 2 are identical with each other in essential respects but differ only in that one of these clamping members, as the clamping member 1, is adapted for use with the left hand radius rod 3 while the other clamping member is adapted for use with the right hand radius rod 4 of an automobile having the forwardly diverging radius rods 3 and 4 attached at their forward ends to the lower end portions of the spring perches 5 underneath the front axle 6 of the automobile. I therefore shall describe the left hand clamping member 1 in detail, it being understood that the right hand clamping member comprises like parts which are identical in essential respects.

The clamping member 1 has a body which comprises a plate-like supporting portion 7 and an integral hook-like attaching portion 8 which extends for the greater part of the length of the supporting portion 7. The bill of the extending portion is indicated at 9 and extends downwardly and then rearwardly toward the supporting portion 7 substantially in the plane of the latter as clearly shown in Figure 2, thus producing a socket or seat 10 in the inner wall of the front portion of the attaching portion 8 for the reception of a portion of the forwardly extending part of the upper flange of the axle 6, which has the shape of an I-beam, as is usual. The inner wall of the rear portion of the attaching part 8 is beveled or inclined downwardly and rearwardly at 11 so that the supporting portion 7 of the clamping member will depend below the level of the upper flange of the axle 6 when the attaching portion 8 is disposed transversely across the axle 6 inwardly of the adjacent front spring perch 5 and is arranged on the front axle so that the forwardly extending edge of the upper flange of the front axle will enter the seat 10 and will be engaged by the bill of the hook-shaped attaching portion 8. The attaching portion 8 may be apertured, as at 12 for the sake of lightness and may be reinforced by an upstanding integral rib 13 which surrounds the aperture 12 and has an extension 14 which is formed on the supporting portion 7 of the clamping member.

The supporting portion 7 is formed with a pair of spaced openings respectively disposed at opposite sides of the strengthening rib 14 and the arms 15 of a substantially U-shaped supporting or hanger member 16 are adapted to extend through these openings and have the upper end portions thereof threaded for engagement with nuts 17. The hanger member 16 is adapted to stay the radius rod 3 against downward movement with respect to the supporting portion 7 of the body of the clamping member and therefore with respect to the front axle 6 of the device. The bend portion of the U-shaped hanger member is indicated at 18 and is flattened as clearly shown in Figures 2 and 3 to provide a relatively wide bearing surface which is in contact with the under and side portions of the adjacent radius rod when the hanger member 16 is disposed with the arms thereof at opposite sides of the adjacent radius rod and with the bend portion 18 of the hanger member extending underneath the adjacent radius rod in position to support the latter against downward movement relatively to the supporting portion 7 of the body of the clamping member. It will be observed at this point that the respective arms 15 of the U-shaped hanger member are twisted slightly in opposite directions at their junctures with the opposite ends of the bend portions of the hanger member so that the lower portion of the hanger member will be turned substantially parallel to the direction of length of the adjacent radius rod and the latter therefore can extend through the bend portion of the hanger member and will be stayed by the latter to the axle without any side stress on the hanger member or on the radius rod.

From the foregoing description of the various parts of the device, the operation thereof may be readily understood. The clamping members 1 and 2 are engaged with the upper flange portion of the front axle inwardly of the spring perches 5 so that the supporting portions of the bodies of the clamping members will be disposed rearwardly of the front axle. The apertures 12 in the attaching portions 8 of the clamping members are of sufficient area to permit the ends of the usual front spring, S (see Figure 4), of the automobile to move therein in the usual manner without hindrance so that the clamping members will not in any way interfere with the functioning of the front spring of the automobile. The hanger members 16 engage with the forward end portions of the radius rods and tend to prevent downward movement of the forward end portions of the radius rods relatively to the axle, thus tending to prevent undue stress on the usual retaining nuts, not shown, on the lower ends of the spring perches 25, whereby the retaining nuts are not likely to become loose or the threads on the lower end portions of the spring perches are not subjected to undue stress, such as is likely to be imposed on the threads at the lower end of the spring perches of a front axle and radius rod assembly of ordinary construction. The radius rods and the front axle thus will be firmly stayed to each other and the front axle will be maintained in position to permit easy steering of the automobile. Undue wear on the bearings and relatively moving surfaces of the steering mechanism and the parts of the automobile which are associated with the steering mechanism will be prevented.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A staying device for the front end portion of a radius rod of an automobile having a front axle formed with a horizontal flange at its upper side, said staying member comprising a body having a supporting portion and a hook-shaped attaching portion adapted to extend across the front axle and having a bill engageable with the forward edge portion of the flange at the upper side of the front axle, and a substantially U-shaped hanger member having the arms thereof secured to said supporting portion of the body and depending at opposite sides of the front portion of an adjacent radius rod, said hanger member having the bend portion thereof disposed underneath and at the sides of the front portion of the adjacent radius rod for preventing downward movement of the front portion of the radius rod relatively to the axle, said hanger member being open between its arms from the upper side of said portion of the radius rod to the supporting portion of the body of the device.

2. A staying device for the front end portion of a radius rod of an automobile having a front axle formed with a horizontal flange at its upper side, said staying member comprising a body having a supporting portion and a hook-shaped attaching portion adapted to extend across the front axle and having a bill engageable with the forward edge portion of the flange at the upper side of the front axle, a substantially U-shaped hanger member having the arms thereof secured to said supporting portion of the body and depending at opposite sides of the front portion of an adjacent radius rod, said hanger member having the bend portion thereof disposed underneath and at the sides of the front portion of the adjacent radius rod for preventing downward movement of the front portion of the radius rod relatively to the axle, the bend portion of said hanger member being flattened and being turned slightly from the plane of the upper end portions of the arms of the hanger member to extend in the direction of length of the adjacent radius rods.

3. A radius rod staying member comprising a body consisting of a plate-like supporting portion and a hook-like attaching portion integral with the supporting portion and adapted to extend transversely across the front axle of an automobile inwardly of a front spring perch on said axle, said attaching portion having the bill thereof extending downwardly and then rearwardly to engage with the forwardly extending flange at the upper side of said axle and the inner wall of the rearward portion of said attaching part of the body being inclined downwardly and rearwardly and constituting an inclined shoulder in contact with the rear edge of the flange at the upper side of the axle, whereby said supporting portion of the body of the steering member will be disposed rearwardly of the front axle, and a substantially U-shaped hanger member carried by said supporting portion of the body and passing around the underside of the adjacent portion of a radius rod of the automobile for preventing downward movement of said radius rod relatively to the body of the staying member, said attaching portion of the body of the staying member being apertured to provide clearance for the adjacent end of the usual front spring of the automobile.

4. A staying member for a radius rod of an automobile comprising a body consisting of a plate-like supporting portion and a forwardly extending hook-like attaching portion having a bill engageable with the forwardly extending edge portion of the upper flange of the front axle of the automobile, said supporting portion having spaced openings, and a substantially U-shaped hanger member having a bend portion passed around the underside of the forward end portion of the adjacent radius rod of the automobile and having arms extending upwardly at opposite sides of the radius rod through the openings in the supporting portion of the body of the device, and nuts engaged with the upper end portions of the arms of said U-shaped hanger member for preventing downward movement of the arms of the hanger member relatively to the body of the device, the space between said arms being open between said supporting portion of the body of the device and the upper side of the radius rod.

5. A staying member for a radius rod of an automobile comprising a substantially rigid body consisting of a plate-like supporting portion and a forwardly extending hook-like attaching portion having a bill engageable with the forwardly extending edge portion of the upper flange of the front axle of the automobile and having a rearwardly and downwardly inclined shoulder in engagement with the rear edge of said flange, said supporting portion having spaced openings close to the rearward edge of said flange of the axle, a substantially U-shaped hanger member having a bend portion passed around the underside of the forward end portion of the adjacent radius rod of the automobile and having arms extending upwardly above the level of the upper side of the forward end portion of the radius rod and through the openings in the supporting portion of the body of the device, and nuts engaged with the upper end portion of the arms of said U-shaped hanger member for preventing downward movement of the arms of the hanger member relatively to the body of the device.

SAMUEL C. EWENS.